United States Patent [19]
Jensen

[11] Patent Number: 5,911,813
[45] Date of Patent: Jun. 15, 1999

[54] CONFECTIONERY DISPENSER WITH DETERGENT CLEANING SYSTEM

[75] Inventor: Erik Hviid Jensen, Aabenraa, Denmark

[73] Assignee: Gram A/S, Vojens, Denmark

[21] Appl. No.: 08/983,359

[22] PCT Filed: Jul. 17, 1996

[86] PCT No.: PCT/DK96/00325

§ 371 Date: Jan. 12, 1998

§ 102(e) Date: Jan. 12, 1998

[87] PCT Pub. No.: WO97/03570

PCT Pub. Date: Feb. 6, 1997

[30] Foreign Application Priority Data

Jul. 17, 1995 [DK] Denmark .................. 0836/95

[51] Int. Cl.[6] .............. A23G 9/00; A23G 9/30; B08B 9/06; B67D 1/08
[52] U.S. Cl. .......... 99/450.7; 99/450.1; 99/452; 99/517; 134/18; 134/57 R; 141/91; 222/148; 222/478
[58] Field of Search ............ 99/450.1, 450.2, 99/450.6, 450.7, 450.8, 494, 452–455, 517, 516; 134/18, 104.1, 115 R, 201, 25.2, 56 R, 57 D, 57 R, 95.1, 98.1, 100.1; 222/148, 478; 141/89, 90, 91, 92; 239/112; 422/111; 426/101, 130, 249, 289, 515, 516, 565, 567

[56] References Cited

U.S. PATENT DOCUMENTS

| | | |
|---|---|---|
| 4,534,494 | 8/1985 | Hautemont . |
| 4,730,631 | 3/1988 | Schwartz ............................ 141/91 X |
| 4,848,381 | 7/1989 | Livingston et al. . |
| 5,322,570 | 6/1994 | Anderson ............................ 134/18 |
| 5,348,058 | 9/1994 | Ruhl ............................ 141/89 X |
| 5,493,957 | 2/1996 | Kennedy et al. ............................ 99/450.7 |
| 5,520,100 | 5/1996 | Wadell ............................ 99/494 X |
| 5,540,141 | 7/1996 | Grubzak ............................ 99/450.4 |
| 5,681,400 | 10/1997 | Brady et al. ............................ 134/18 |
| 5,755,155 | 5/1998 | Buesing ............................ 99/453 |

*Primary Examiner*—Timothy F. Simone
*Attorney, Agent, or Firm*—Watson Cole Grindle Watson, P.L.L.C.

[57] ABSTRACT

A dispenser (1) for filling containers with confectionery such as ice cream includes a plurality of filler nozzles (2) with inlet openings (27, 28) and nozzle tips (3, 7), in each filler nozzle including a filler piston (9) displaceable in a filler housing (10). The filler housing and the filler piston are produced from a stainless steel with a treatment so that these surfaces can move together without tearing and at the same time are produced with such tolerances that the gap formed between the piston and the housing is impermeable to the confectionery but not impermeable to liquid. A hose/pipe arrangement (40) for detergent is connectable with the inlet openings (27, 28) and the nozzle tips (37) for flushing and cleaning, the detergent passing through the gap between the piston (9) and the housing (10) to exit through a hollow space (50) and be flushed by the detergent introduced from at least one nozzle tip (37). Owing to this, complete flushing/cleaning of the nozzle arrangement (1) is obtained.

10 Claims, 9 Drawing Sheets

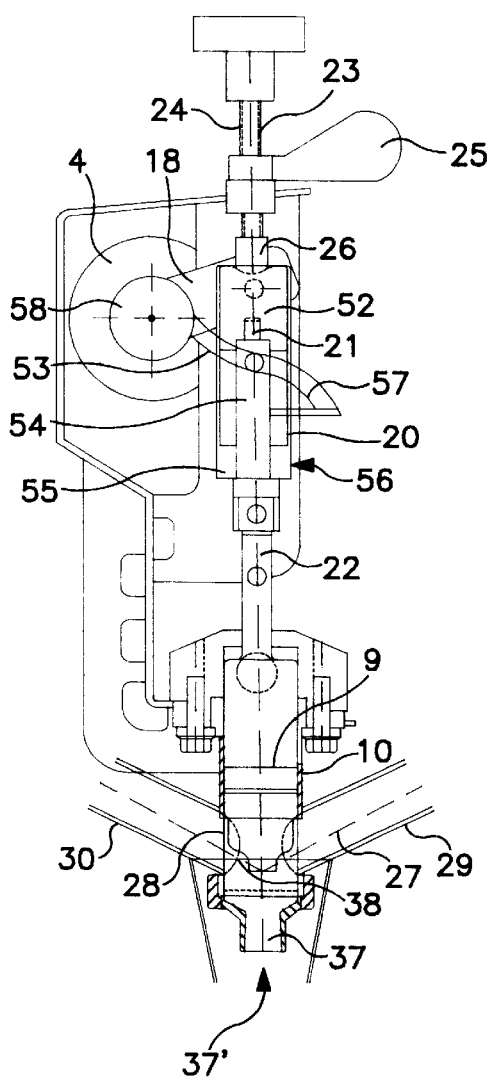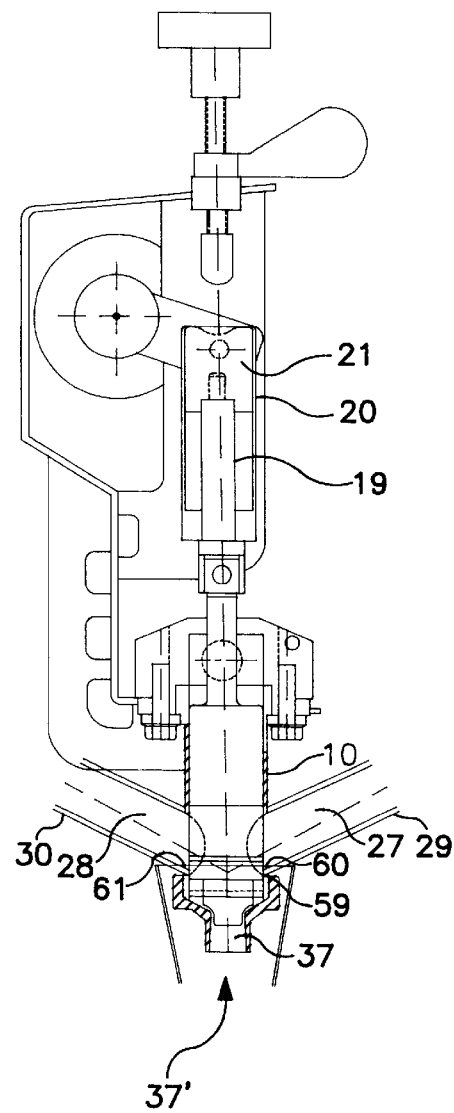
FIG. 9
FIG. 10
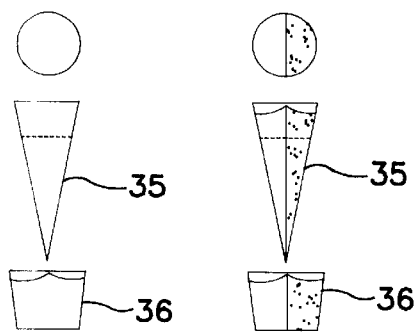
FIG. 11

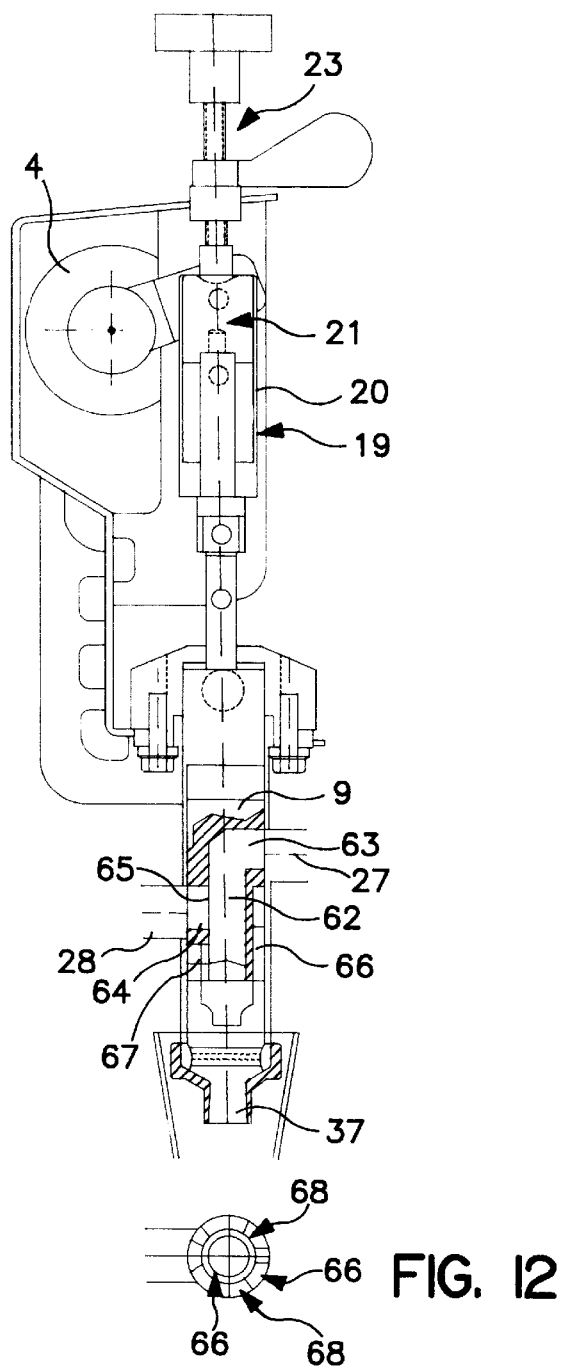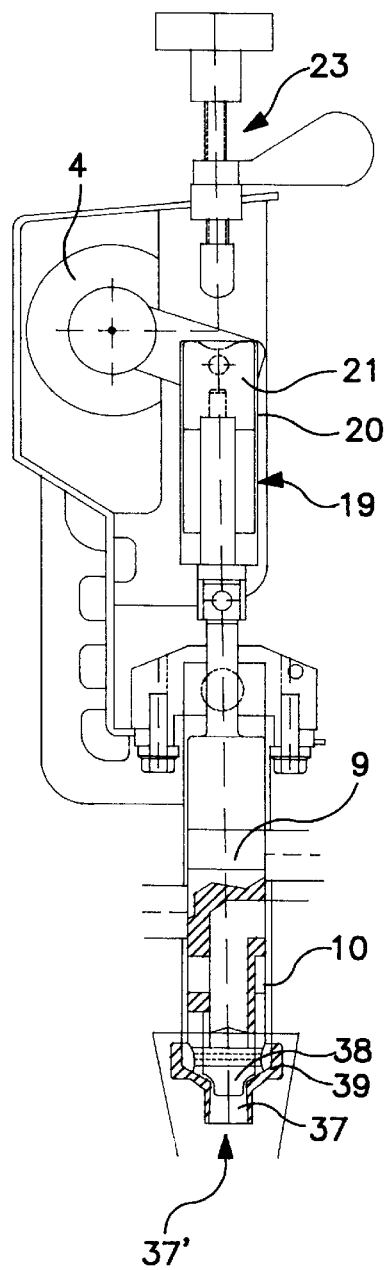
FIG. 12
FIG. 13
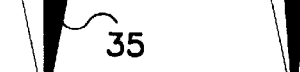
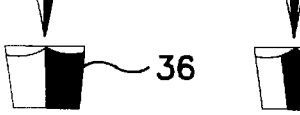
FIG. 14

CONFECTIONERY DISPENSER WITH DETERGENT CLEANING SYSTEM

BACKGROUND OF THE INVENTION.

The present invention relates to a nozzle arrangement for use in filling a confectionery product into containers wherein a row of adjacent filler nozzles are arranged in a common rack, each of the filler nozzles including a filler housing with one or more inlet openings, a nozzle tip connected with the filler housing for outlet of the confectionery product and a filler piston, which is displaceable in the filler housing to open/close the inlet openings and the tip, wherein the row of adjacent filler nozzles is arranged to activate the filler pistons by means of a common actuating shaft, and wherein the inlet openings of the nozzles and the filler tip have connecting pieces designed to be connected with a hose/pipe arrangement for a detergent.

The invention may be used for filling any confectionery product containing air and consequently being compressible. such as ice cream. sorbet. mousse and the like. The invention will be explained in relation to ice cream but is not limited to that product alone.

Ice cream filling machines with nozzle arrangements of the type described are known, e.g., from EP 0.287,194. The known machines are disadvantageous, however, since these machines are difficult to clean. Problems of cleaning particularly arise because separate dynamic gaskets are used between the filler piston and the filler housing of the filler nozzle. In the tracks in which the gaskets are placed there will be a risk of insufficient cleaning when flushing with detergents with a resulting risk of bacterial growth.

Also known are filling arrangements of the type described without dynamic gaskets, but wherein the piston is produced from German silver instead. However, such constructions will also not permit cleaning by flushing with a detergent. Furthermore. they are disadvantageous due to the risk that the ice cream may be polluted by metal particles.

The known nozzle arrangements are further disadvantageous because a separate adjustment of the discharge of each individual nozzle unit in a row is required. This may cause quite considerable difficulties in obtaining a uniform filling of the containers, which are conveyed in adjacent rows, one row being conveyed under each filler nozzle of the nozzle arrangement. Thus, it is important that a uniform amount of ice cream is discharged into each container.

The ice cream will normally be conveyed to filler nozzles from an ice cream freezer by a well-known method, the so-called time-elapse principle. This means that the time of filling is dependent on the time when nozzles are open and that the amount of filling depends on the pressure built up in feeding hoses during nozzle closure and on the flow of ice cream from the ice cream freezer. Hitherto the uniform filling through all nozzles has been obtained by regulating the flow resistance. which is of great importance to correct filling, in each individual nozzle by inserting a flow valve to control the flow resistance before each individual filler nozzle. This is obviously a technically complicated construction. Although it is possible to regulate the flow resistance by adjustment of the flow valve, the construction will still be very difficult to clean in a reliable manner by flushing with a detergent.

Furthermore, the known valve arrangement will make it difficult to produce ice cream products containing filling pieces such as fruit, chocolate, or nougat. Due to the flow valves there will be a risk that filling pieces, which have to pass through the valve, will instead get stuck and cause a disturbance of the desired and intended flow resistance to which the flow valve is adjusted in relation to each individual filler nozzle.

In the known machines there will further be a difficulty in performing a correct stop of the filling with the known filler nozzles. Thus, it is a frequent experience that under the filling nozzle and in the top of the filled container there will be a conic remainder of ice cream, a so-called snip. The conic ice cream mass may drop from the filler nozzle tip onto apparatuses underneath before a subsequent container is brought into position under a filler nozzle. Thus, this results in a pollution risk.

Furthermore, the upright conic projection in the filled container will be undesirable in consideration of the aesthetic appearance of the ice product produced. The conic projection may also be undesirable in the ice product formed in the container as there may arise problems with subsequent placement of chocolate and garnish on top of the ice cream or in subsequent placement of a lid on the container.

Furthermore, the formed snip may cause a disturbance in a pattern when producing ice cream products with different tastes/colours in the ice cream, which is introduced into the filler nozzle through different cream inlet openings.

It is the object of the present invention to remedy the disadvantages of the known filling arrangements and to provide a nozzle arrangement that is easy to clean and which permits at the same time a correct filling of containers with an ice cream, which may contain filling pieces. e.g., of fruit. chocolate or nougat.

SUMMARY OF THE INVENTION

This is obtained according to the present invention by an apparatus characterised in that the piston and the filler housing are produced with tolerances of the piston and the filler housing so as to create an annular gap that is impermeable to confectionery product but not impermeable to liquid. and that the hose/pipe arrangement is arranged to let the detergent in through the inlet openings of the nozzles and to let the liquid out via the nozzle tips, and that at least one nozzle tip is connected via the hose/pipe arrangement with the common rack, which includes a hollow space letting the detergent through the rack to wash the filler housings behind the pistons.

As the piston and the filler housing are produced with tolerances so that a viscous confectionery product will not be able to pass through the gap between the piston and the filler housing, and since the gap is produced with such tolerances that a light-fluid detergent may be pressed through the annular gap between the filler piston and the filler housing when applying the pressure ordinarily occurring in detergent. a reliable cleaning is obtained. As no kinds of loose gaskets in the form of 0-rings or the like are used, it will be possible to perform a complete cleaning of the system when it is flushed with detergent. It should be noted that during cleaning of the nozzle arrangement the filler piston will be activated at intervals. This ensures that the detergent introduced through the connection pieces at the inlet openings is able to pass into the gap between the filler piston and the filler housing.

With a nozzle arrangement in which the filler housing and piston are produced from stainless steel that is surface hardened, preferably by a so-called Hardcor treatment, it will be possible to obtain a very smooth and hard surface. Thus, it will be possible that the piston and the housing may be produced from stainless steel of approved quality for use in the production of food. Furthermore, the surface will be produced so that the piston and the housing run together without tearing at the reciprocating movement of the piston. Alternatively, the piston and filler housing may be produced from a ceramic material or from plastic.

A hose/pipe arrangement for detergent may easily be connected to the nozzle arrangement. Inlet of detergent will take place through ice cream feeding hoses and via the inlet opening of each filler nozzle. The liquid then flows into the filler housing and the major part will exit through the nozzle tips whereas a minor part of the liquid detergent will pass behind the piston whereby cleaning of the gap between the filler piston and the filler housing is performed. If the nozzle tips have a member for building up a pressure resistance, a particularly great reliability of obtaining the intended flow of detergent through the nozzle arrangement is obtained.

The tip of at least one of the filler nozzles is connected with the common rack or the common housing on which the nozzle arrangement is mounted. In this manner it is ensured that the detergent will be led through a hollow spacing, which communicates with each filler housing so that the detergent may be led through the rack to obtain an effective flushing of the filler housings behind the filler pistons. Thus the detergent will be let out of the nozzle arrangement via an outlet that is connected with the hollow rack.

Each filler nozzle is connected, via a manifold, with an ice cream freezer. In order to obtain uniform filling of containers passing underneath the filler nozzles, a regulating member is placed between the common actuating shaft and each piston. By this means the stroke of the piston may be adjusted. As a well-defined ice cream is conveyed to the manifold, a reduced discharge from a single filler nozzle will lead to increased filling from the other filler nozzles.

If the regulating member is an air spring, a construction is obtained which is particularly easy to clean. As the chamber of the spring is connected with a hollow space in the common actuating shaft, a large buffer is obtained. Therefore, it is possible to use a relatively short hose connection. This increases the ease of the cleaning. At the same time the buffer will make it possible to form a spring with a relatively small extension and having a substantially unchanged spring characteristic at different mutual positions of the cylinder housing and piston of the air spring. Thus, the air spring may easily be placed in the relatively limited space that exists at the rod connection between the rocker arm of the actuating shaft and the filler piston.

In a nozzle arrangement in which the top of the filler piston is provided with a projecting nose extending into the nozzle tip, an elongated annular channel is formed. Such an elongated annular channel may have a relatively large cross section area, which permits passage of filling pieces while at the same time a predetermined desired flow resistance through the filler nozzle is maintained. In this manner it will be possible to obtain a cleaning-friendly nozzle arrangement in which no flow valve is used before each filler nozzle. Flow regulation for control of the flow resistance in each filler nozzle may thus be obtained by adapting the length of the formed channel between the projecting nose and the nozzle tip as well as the cross section area of said annular channel.

The nozzle arrangement according to the invention may have a filler piston that is hollow in order thus to permit the production of products with different flavours/colours, which are formed as so-called windmill patterns or in so-called side-by-side patterns.

The ice cream may also contain filling pieces. The filling pieces will not produce an undesirable effect on and change of the flow resistance through the filler nozzles, as the filling pieces will easily pass through the cream inlet openings and the passages/hollow spaces formed by the filler piston. Subsequently the filling pieces will easily pass through the annular channel used to regulate the flow resistance through the filler nozzle. Thus, this annular channel may have a relatively large cross section and simultaneously a sufficiently large flow resistance. This is possible as the annular channel has a relatively large extension in axial direction, whereby the flow resistance is built up.

Furthermore, it will be possible to make a precise regulation of the flow resistance, since it is easy to regulate the length of the annular channel. This construction will be very cleaning-friendly. and there will be no risk that filling pieces will become stuck in the filler nozzles.

DESCRIPTION OF THE DRAWINGS.

The invention will now be explained in detail with reference to the accompanying drawings, wherein

FIGS. 9 and 10 show views, partly sectional, of a first embodiment of a filler nozzle for use in a nozzle arrangement according to the invention;

FIG. 11 illustrates ice cream products that may be produced by using the filler nozzle shown in FIGS. 9 and 10;

FIGS. 12 and 13 show views corresponding to FIGS. 9 and 10 of a second embodiment of a filler nozzle for use in a nozzle arrangement according to the invention; and FIG. 14 illustrates ice cream products that may be produced by using the filler nozzle shown in FIGS. 12 and 13.

DETAILED DESCRIPTION OF THE PREFERRED EMBODIMENTS

Figure 1:
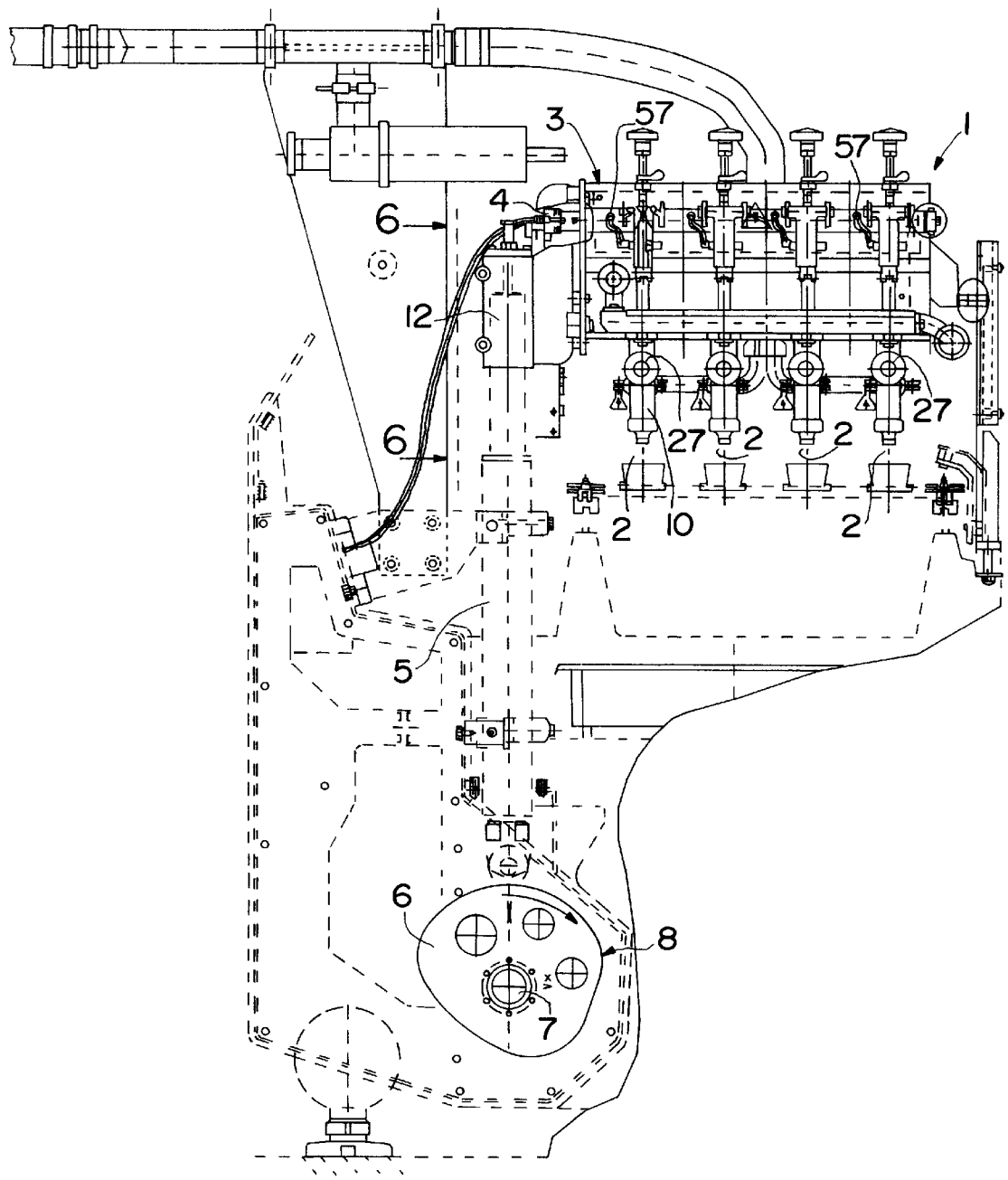
FIG. 1 shows a side view, partly sectional, of a nozzle arrangement according to the invention, as well as parts of an ice cream filling apparatus in which it is used.

FIG. 1 shows a nozzle arrangement 1 including four adjacent filler nozzles 2. Alternatively, a different number may be used, e.g., six or eight adjacent filler nozzles 2. The filler nozzles 2 are arranged in a row in a common rack 3 so that that they may be actuated by a common pivot shaft 4. The rack 3 with the filler nozzles 2 arranged on it is moved in a movement up and down established via a rod connection 5 by a cam disc 6 rotating around a shaft 7. The cam disc 6 has an outer contour 8, which guides the movement of the rack 3.

The manner in which the common pivot shaft 4 actuates filler pistons 9 (see FIG. 3) arranged in a filler housing 10 of each filler nozzle 2 will be explained with simultaneous reference to FIGS. 1, 5 and 6. Fastened on the rack 3 is an air cylinder 12 which includes a cylinder housing 13 and a piston 14. The piston 14 is connected via a rocker arm 15 with the shaft 4 to give it its rotating movement back and forth. The air cylinder 12 is provided with air by hoses 16, 17.

The pivot shaft 4 is connected via rocker arms 18 with an air spring in the form of a cylinder housing 20 of an air cylinder 19. It should be noted at first that,instead of the air cylinder 19 functioning as an air spring, it will be possible to use a different spring having a substantially constant spring characteristic. However. such a different spring will be difficult to clean and requires much space.

The air cylinder 19 further includes a piston 21. The air cylinder 19 is a part of a rod connection 22 connecting the rocker arm 18 with the filler piston 9 of a filler nozzle 2. The piston 21 of the air cylinder 19 is in contact with a regulating spindle 23. The regulating spindle 23 is provided with a thread 24 and a screw cap 25. Thus it is possible for the spindle 23, via a pressing means 26, to press the piston 21 a larger or smaller distance into the housing 20 so that the total length of the air cylinder 19 may be adjusted. This effects the stroke of the filler piston 9 in the filler housing 10 and thus also the amount of ice cream to be discharged by each stroke of the piston 9.

The filler housing 10 of each filler nozzle 2 in the embodiment shown has two ice cream inlet openings 27, 28. Each ice cream inlet opening 27. 28 is provided with a connection piece 29. 30. which is connected with a manifold 31. 32. which is connected via hoses 42. 43 and a branch pipe 33 with an inlet conduit 34. which is connected with an ice cream freezer (not shown). By adjusting the spindle 23 the amount discharged by each filler nozzle may be adjusted, and since a constant amount of ice cream is let into a manifold, it will be possible to obtain a uniform discharge of ice cream from all filler nozzles 2 in a row. This is important in respect of correct filling of containers used, which, as shown in FIGS. 11 and 14, may be cones 35, cups 36 or buckets (not shown).

The filler nozzle 2 and the filler housing 10 are provided with co-operating surfaces, which have been given a Hardcor treatment. Thus, these parts are produced from stainless steel having a surface which is able to run together without tearing. The tolerances are arranged so that the annular gap formed between them will be impermeable to ice cream but not to liquid. In other words, this means that during a filling process ice cream will not get behind the pistons 9, whereas during cleaning (which will be explained below), it will be possible to press a detergent through this gap in order to obtain total cleaning of the nozzle arrangement.

The ice cream fed to the filler nozzle 2 via the inlet openings 27, 28 is pressed out into a container via a nozzle tip 37. The nozzle tip 37 and the piston 9 will appear most clearly from FIGS. 9, 10 and 12, 13. At its top the piston 9 has a piston nose 38, which, in the closed state of the filler nozzle (FIGS. 10 and 13), projects into the nozzle tip 37 so that an elongated annular channel 39 is formed between these two elements. This channel 39 is used for adjusting the flow resistance through the filler nozzle 2. In this manner it is possible to have a relatively large cross section area which permits filling pieces to pass through the filler nozzle 2, while an adequate flow resistance may be obtained by giving the annular channel 39 an adequate extension in axial direction.

As the piston nose 38 projects into the tip 37, the volume of the latter will be relatively small whereby it will be possible to avoid the formation of a cone-shaped remainder of ice cream outside the discharge opening 37' of the tip 37 and in the top of a container. In this manner there will be no risk of pollution of the apparatus by ice cream dripping down from the filler nozzle 2 without a container being located under the opening 37'. Furthermore. there will also not be any risk of difficulties in closing the container with a lid. Finally, placing chocolate and other garnish on top of the ice cream will not be made difficult due to a projecting cone shape in the ice cream product formed.

The nozzle arrangement 1 is designed so that it may be connected with a hose/pipe arrangement 40 for a detergent, which is used to clean the nozzle arrangement 1.

Figure 3:
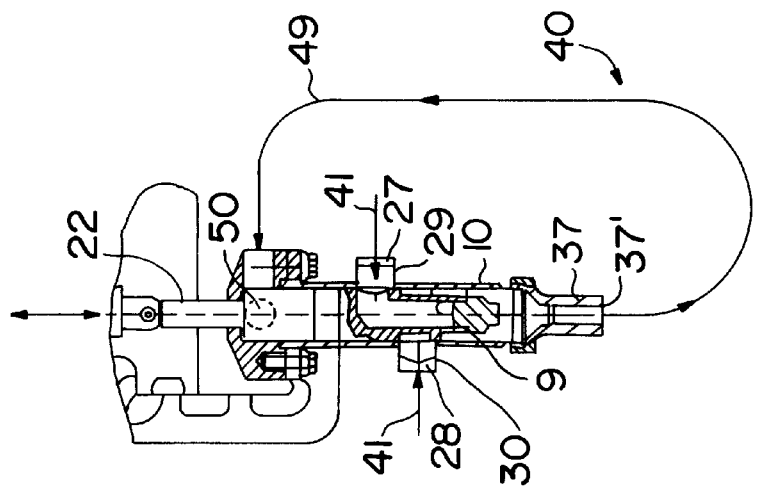
FIGS. 2 and 3 show respectively a side view, and a sectional view through parts of the filling apparatus to illustrate the principle in cleaning.
Figure 2:
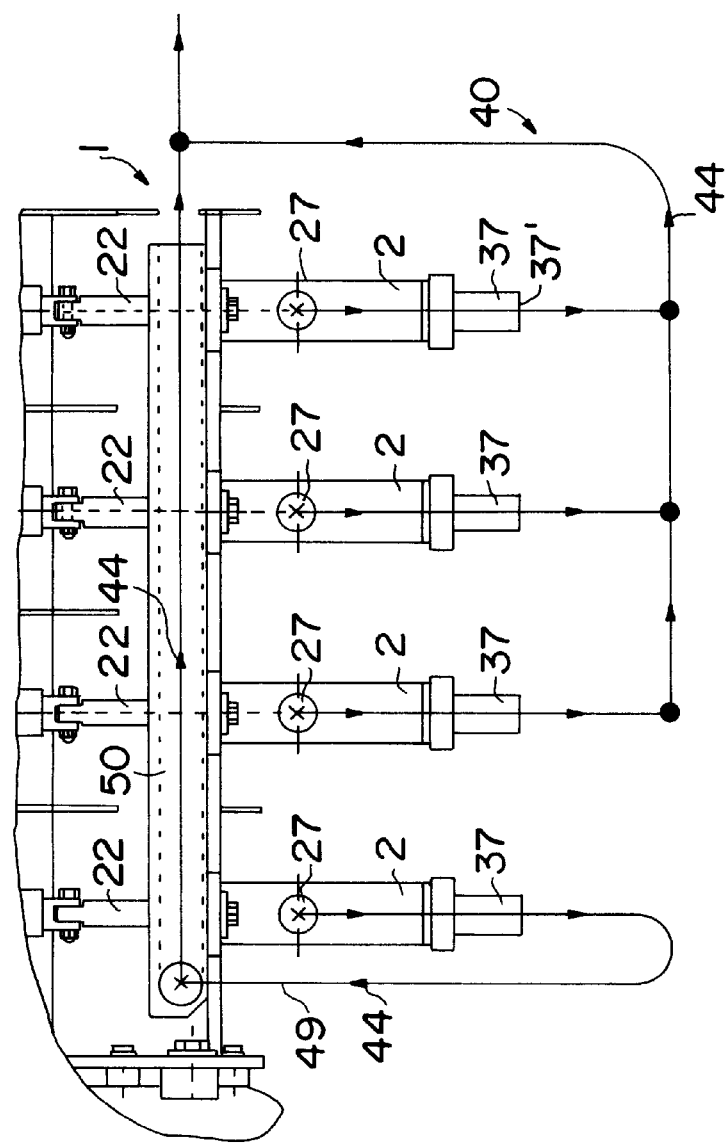
Figure 4:
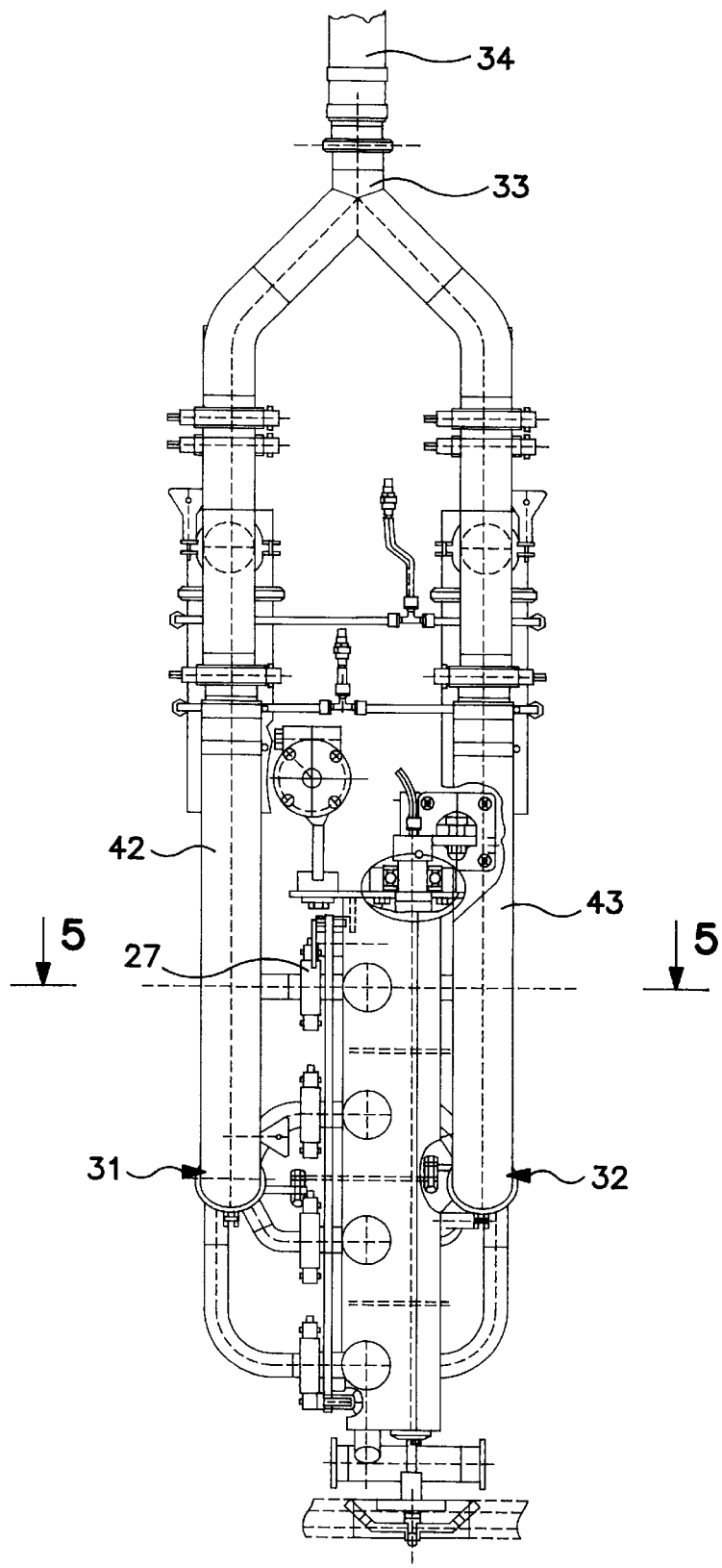
FIG. 4 shows a plan view of a nozzle arrangement according to the invention.
Figure 7:
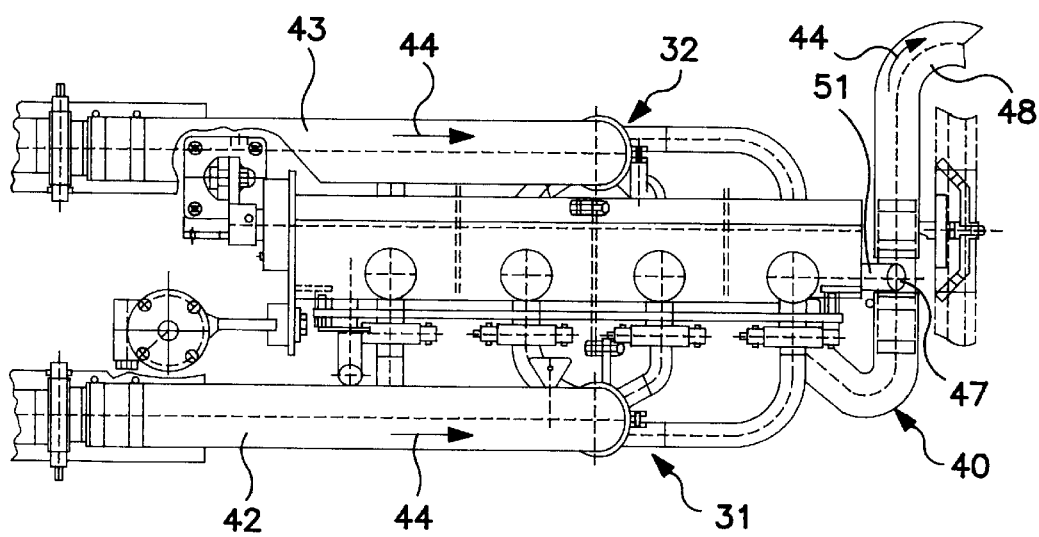
FIGS. 7 and 8 show respectively a plan view and a side view of the nozzle arrangement according to the invention connected with a hose/pipe arrangement for detergent.
Figure 8:
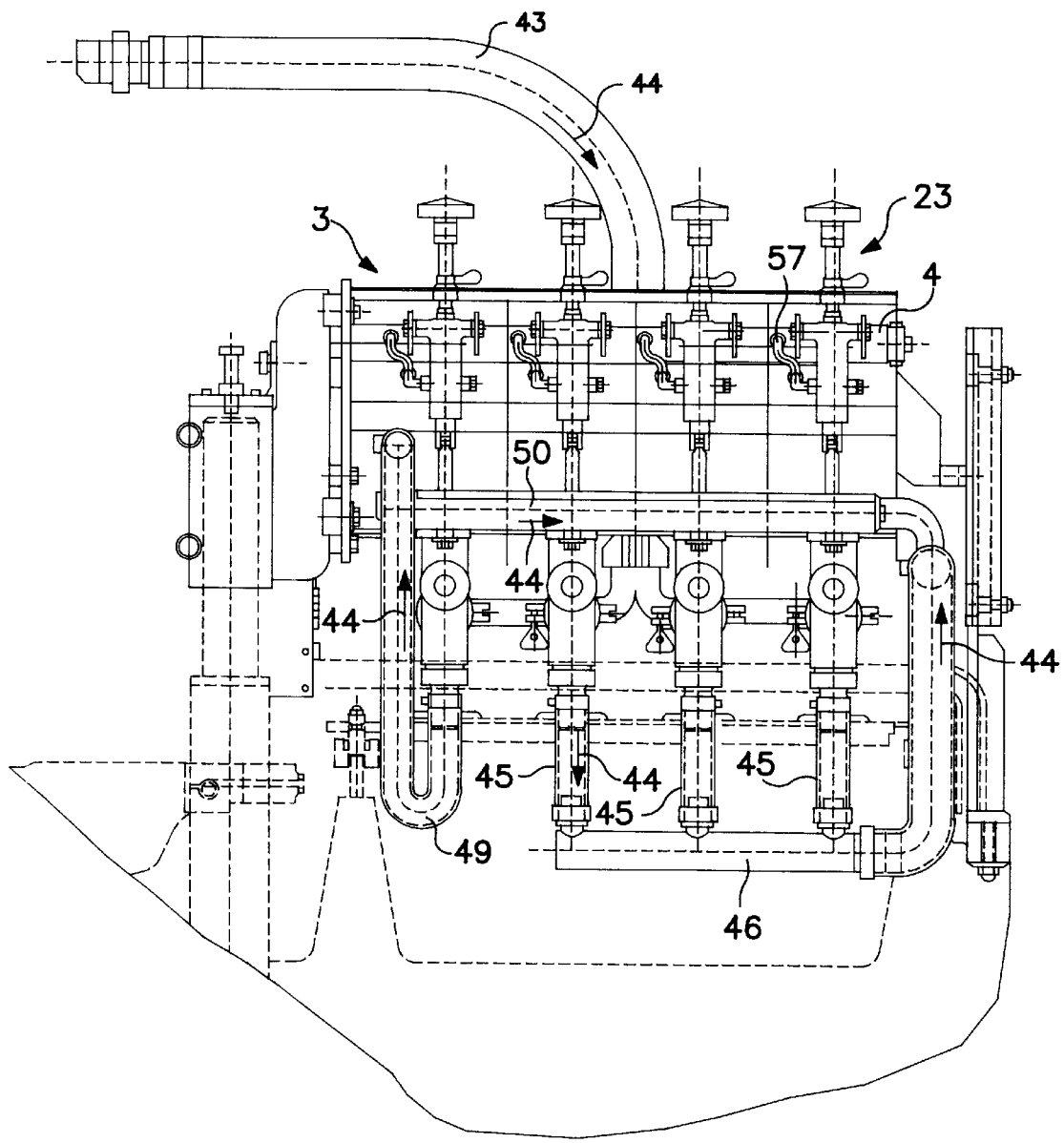

FIGS. 2 and 3 illustrate a schematic manner in which the hose/pipe arrangement 40 is coupled with the nozzle tips 37 of the nozzle arrangement 1, and FIGS. 7 and 8 show how the hose/pipe arrangement is connected with the shown nozzle arrangement 1.

Detergent is let in at 41 through the inlet openings 27, 28 of the filler nozzles 2. These inlet openings are provided with the connection pieces 29, 30 for fastening the ice cream manifolds 31, 32. The detergent flows through the ice cream freezer, the inlet 34, the branch pipe 33, the manifolds 31, 32 and the inlet openings 27, 28 into the nozzle arrangement 1 according to the arrows 44. The detergent is let in via the inlet openings 27, 28 to all the filler nozzles 2. The liquid is taken out through the nozzle tips 37 and the hose/pipe arrangement 40.

In the embodiment shown, three of the nozzle tips 37 are connected via hoses 45 with a connection pipe 46, which leads the detergent through a branch piece 47 to an outlet hose 48. The fourth nozzle tip 37 is connected with a hose 49, which leads the liquid to a hollow space 50 in the rack 3 of the apparatus. The hollow space 50 is connected with each filler housing 10 so that the detergent is led through the hollow space 50 of the rack 3 to wash the filler housings 10 in a position behind the filler pistons 9. The detergent is led from the hollow space 50 via a connection piece 51 on the branch piece 47 and from there out through the outlet hose 48.

As the tolerances between the filler pistons 9 and the filler housing 10 permit liquid to pass through the gap formed between them, a total cleaning of the hose arrangement 1 is obtained. As smooth surfaces are used. there is no risk of defective cleaning such as may occur when using dynamic gaskets between the filler piston 9 and the filler housing 10. As the nozzle tips 37 are provided. when coupled with the hoses 44, with a member for building up a pressure resistance in the form of contractions (not shown), a pressure is built up in the filler nozzles 2 ensuring that part of the liquid let through the inlet openings 27, 28 is pressed through the gap between the piston 9 and the housing 10. In order to ensure complete flushing, the piston 9 is actuated at intervals during a flushing cycle.

A typical cleaning takes place by first performing a prewash with water at room temperature before the hose/pipe arrangement 40 is connected. Subsequently, with connection of the hose/pipe arrangement 40, a hot washing is performed with water at an elevated temperature, e.g., in the order of 40–70° C. Subsequently a flushing is performed with detergent, which may have the same temperature. Finally a re-washing is performed with water at room temperature. However, it will also be possible to use other cleaning procedures. E.g., this may be the case when not only an ordinary cleaning/sterilisation is desired in connection with daily operation but it is desired instead to perform a cleaning in order to remove calcareous or lacteous deposits or in order to pacify the stainless material.

Figure 5:
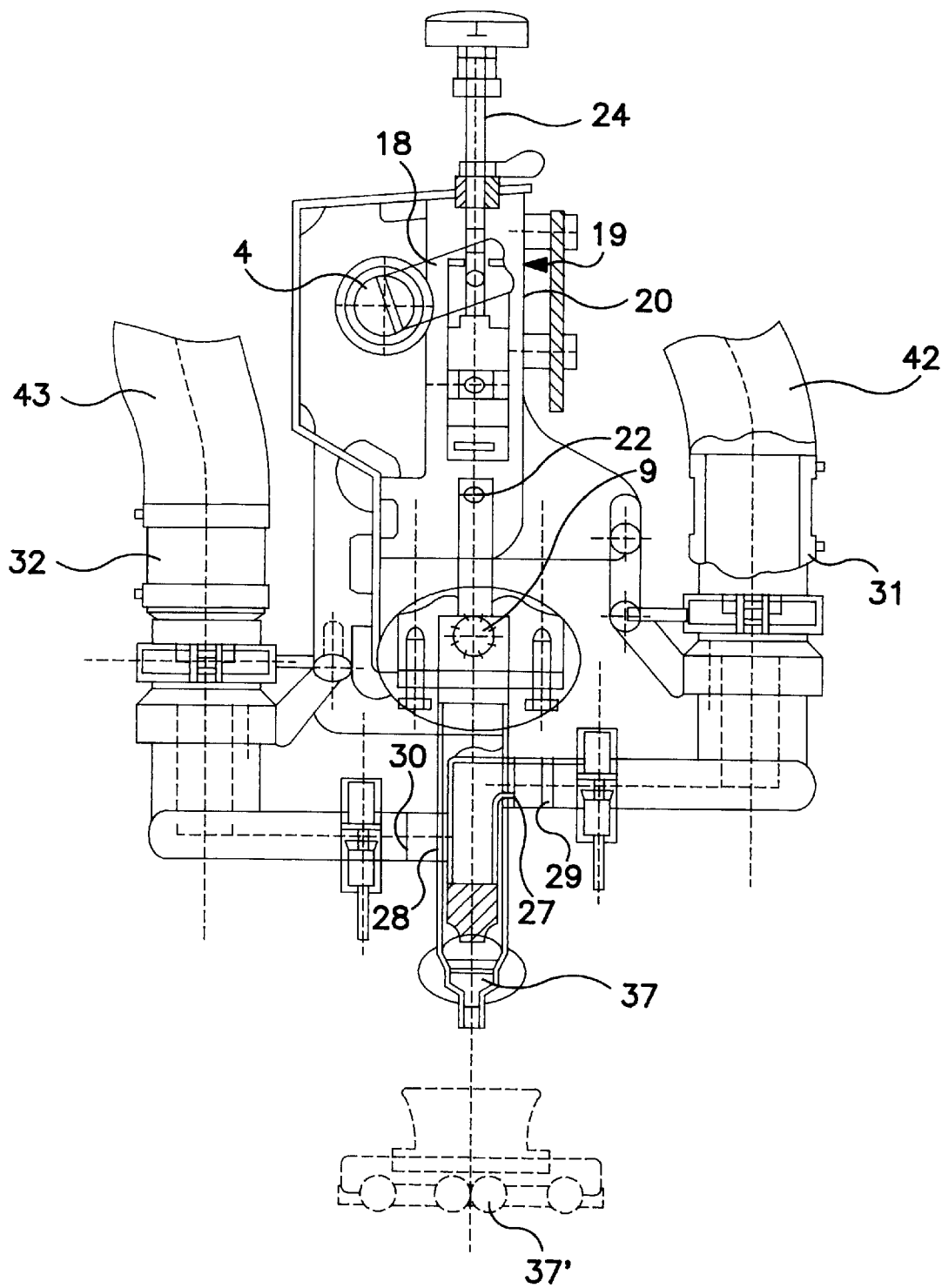
FIG. 5 shows a sectional view through the nozzle arrangement shown in FIG. 4 according to the line 5–5.
Figure 6:
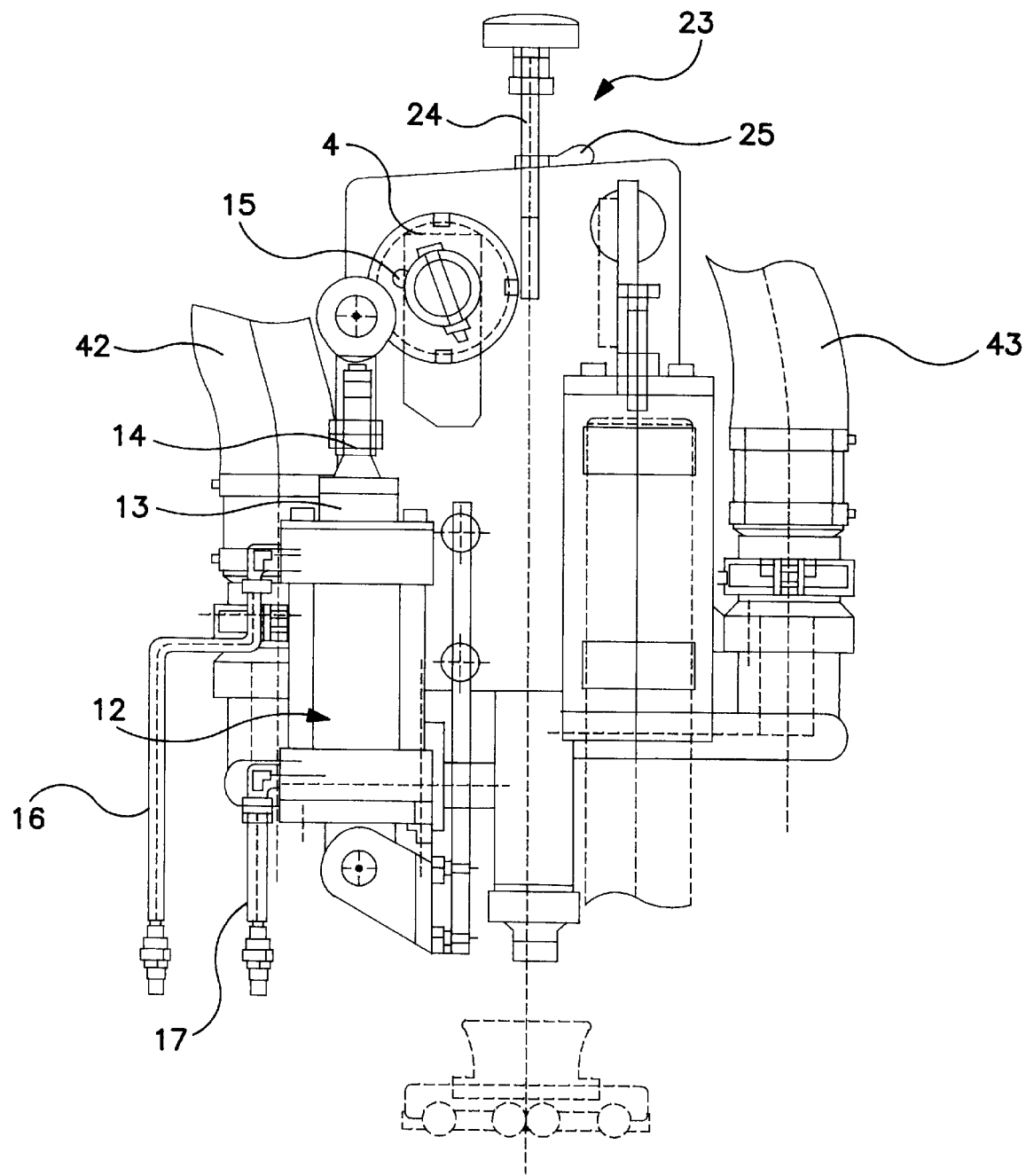
FIG. 6 shows at view of the nozzle arrangement shown in FIG. 1 according to the arrows 6–6.

Referring to FIGS. 5 and 9, next will follow an explanation of the air cylinder 19 inserted in the rod connection 22 between the rocker arm 18 of the pivot shaft 4 and the filler piston 9.

The housing 20 of the air cylinder 19 is connected with the rocker arm 18 at 52. In this manner the housing 20 may be subjected to a reciprocating movement. The piston 21 is provided with sealings 53 tightening against the cylinder housing 20. and sealings 55 are also placed at the passage of the piston rod 54 of the piston 21 through the housing 20. Thus, an airtight chamber 56 is formed inside the cylinder 19. The chamber 56 is connected via a hose connection 57 with a hollow space 58 inside the pivot shaft 4. By using a large hollow space 58 in the shaft 4 a large buffer of air is obtained rather than just having the volume of the chamber 56. In this manner an air spring with a very flat characteristic is obtained. This is important as the spring characteristic must not be changed even if the spindle 23 is adjusted to give the filler piston 9 a larger or smaller stroke. As the pivot shaft 4 is used as a pressure reservoir, the hose connection 57 may be very short and consequently very easy to clean.

In FIGS. 9 and 10 a first embodiment of the filler piston 9 is seen in an open, respectively a closed state. The piston 9 is of a so-called piston valve type, which is provided with a projecting piston nose 38. This piston is solid. The piston 9 has an annular contact surface 59, which is in engagement with the inner side of the filler housing 10. When the annular surface 59 has passed by the lowest point 60, 61 of the inlet openings 27, 28, the ice cream inlet through the connection pieces 29, 30 will be blocked. In this position a container located underneath, which has been filled, will be displaced whereupon a new empty container is placed under the opening 40 in the nozzle tip 37. When the filler nozzle 2 is open, such as shown in FIG. 9, a sufficiently large passage is formed for filling pieces to pass down through the inlet openings 27, 28 and out through the tip 37. During its closing movement. the piston 9 has a cutting function so that filling pieces located partly in the inlet openings 27. 28 and the chamber will be cut through during closing. When the filler nozzle 2 is closed. as shown in FIG. 10, the annular channel 39 will have a sufficient cross section area for filling pieces to be located therein without disturbing a correct closing function. Thus, with such a filler nozzle it will be possible to produce an ice cream having filling pieces.

As shown in FIG. 11. it is possible to supply the same type of ice cream from both inlet openings 27, 28 in order to form a uniform product in a cone 35 or in a cup 36. By supplying different ice creams through the two inlet openings 27, 28, an ice cream product of the so-called side-by-side type may be formed, wherein two different types of ice cream are placed in a container. such as the cone 35 or the cup 36. It will be possible to use the same or different types of filling pieces in the ice cream or ice creams supplied.

FIGS. 12 and 13 show a different embodiment of a filler nozzle according to the invention. Here a filler piston 9 is used that is different from the filler piston 9 shown in FIGS. 9 and 10. The filler piston 9 shown here has a hollow in the form of an inner channel 62. Via a bore 63 the channel 62 is in connection with the ice cream inlet 27 in the open position of the filler nozzle 2 shown in FIG. 12. In this position the ice cream inlet 28 is in connection with an annular chamber 64 formed by an annular track 65 in the piston 9. The annular chamber 64 is connected with a number of longitudinal channels 66, which are able to lead the ice cream toward the tip 37. The bore 63 is connected via a number of openings 67 with a number of separate tracks 68 which, in the circumferential direction, are positioned between the longitudinal tracks 66. In this manner the ice cream from the channel 62 is also led toward the tip. The channel 62, the annular track 65 and the longitudinal tracks 66 and 68 are dimensioned such that filling pieces are able to pass through them uninhibited.

With a filler nozzle thus designed it will be possible to produce so-called windmill patterns, such as illustrated in FIG. 14.

It will also be possible to produce a concentric ice product. which is shown in the outmost right position in FIG. 14. This product is produced when the channel 62 leads into the tip directly through the piston nose rather than through openings 67 and longitudinal tracks 68.

The filler piston 9 shown in FIGS. 12 and 13 are provided with a projecting piston nose 38 to form an annular channel 39. The channel 39 permits filling pieces to pass through without the risk of making a correct closing of the filler nozzle 2 impossible. When the filler nozzle is closed, the ice cream inlet 27, 28 will not be in connection with the bore 63, respectively the annular chamber 64.

FIG. 14 shows products that may be produced by using the filler nozzle 2 shown in FIGS. 12 and 13.

I claim:

1. A dispenser apparatus for use in filling a confectionery product into containers; said dispenser apparatus comprising a common rack having a hollow channel therein, a row of adjacent filler nozzles mounted on the common rack, each of the filler nozzles comprising a filler housing with at least one inlet opening, a nozzle tip connected with the filler housing for outlet of the confectionery product and a filler piston which is displaceable in the filler housing to open and close the inlet opening and the tip; a common actuating shaft for actuating the filler pistons of the filler nozzles; and connecting pieces for connecting the inlet openings of the nozzles and the filler tip with a supply system for a detergent; wherein the piston and the filler housing of each filler nozzle are dimensioned so as to create an annular gap therebetween that is impermeable to confectionery product but not impermeable to liquid, wherein the supply system is connected to supply detergent through the inlet openings of the filler housings and to convey the liquid out via the nozzle tips and wherein at least one nozzle tip is connected via the supply system with the hollow space for conveying the detergent through the rack to wash the filler housings behind the pistons.

2. A dispenser apparatus according to claim 1, wherein the piston and the filler housing of each filler nozzle are made of stainless steel and have cooperating surfaces that are surface hardened.

3. A dispenser apparatus according to claim 1, wherein the supply system is connected with the nozzle tips via a connecting piece having a member for building up a pressure resistance.

4. A dispenser apparatus according to claim 1, including a manifold for connecting each of the inlet openings with an ice cream feeding station, and a rod connection between the common actuating shaft and each piston, said rod connection including a regulating member for adjustment of the stroke of each piston in order to obtain a uniform quantity outlet in all filler nozzles in a row.

5. A dispenser apparatus according to claim 4, wherein the regulating member is comprised of an air spring having a cylinder housing connected with the common actuating shaft via a rocker arm and a piston connected with the filler piston, wherein the common actuating shaft is hollow, and wherein the air spring chamber is connected via a hose with the hollow space in the common actuating shaft.

6. A dispenser apparatus according to claim 5, wherein the regulating member further comprises a regulating spindle which is in engagement with the piston of the air spring to define the total length of the air spring.

7. A dispenser apparatus according to claim 1, wherein the filler piston is a piston valve designed to block the inlet openings and is provided at a top of the filler piston with a projecting nose that extends into the nozzle tip in order to form an elongated annular channel with the nozzle tip.

8. A dispenser apparatus according to claim 7, wherein members for controlling the flow resistance in each filler nozzle are comprised of the length and the cross section area of the annular channel formed between the nose of the piston valve and the nozzle tip.

9. A dispenser apparatus according to claim 1, wherein the filler piston is hollow, wherein the hollow space is connected with an inlet opening, wherein the filler piston has an annular track which is connected with one or more further inlet openings, and wherein the hollow space and the annular track are connected with a number of separate longitudinal tracks at a top of the piston in order to lead the confectionery toward the tip.

10. A dispenser apparatus according to claim 1, wherein each piston is solid.

* * * * *